(12) United States Patent
Lam et al.

(10) Patent No.: US 8,610,883 B2
(45) Date of Patent: Dec. 17, 2013

(54) PHOTOELASTIC LAYER WITH INTEGRATED POLARIZER

(76) Inventors: Duhane Lam, Vancouver (CA); Mark William Ellens, Richmond (CA)

( * ) Notice: Subject to any disclaimer, the term of this patent is extended or adjusted under 35 U.S.C. 154(b) by 695 days.

(21) Appl. No.: 12/481,572

(22) Filed: Jun. 10, 2009

(65) Prior Publication Data

US 2009/0310119 A1 Dec. 17, 2009

Related U.S. Application Data

(60) Provisional application No. 61/061,958, filed on Jun. 16, 2008.

(51) Int. Cl.
*G01B 11/16* (2006.01)

(52) U.S. Cl.
USPC .......................................... 356/33

(58) Field of Classification Search
USPC ................................... 356/32–35
See application file for complete search history.

(56) References Cited

U.S. PATENT DOCUMENTS

| | | | | |
|---|---|---|---|---|
| 2,920,480 A * | 1/1960 | Haas | | 73/787 |
| 3,067,606 A * | 12/1962 | Oppel | | 356/34 |
| 3,136,154 A * | 6/1964 | Christensen | | 73/787 |
| 3,178,934 A * | 4/1965 | O'Regan | | 356/34 |
| 3,216,312 A * | 11/1965 | Oppel | | 359/489.19 |
| 3,313,204 A * | 4/1967 | Oppel | | 356/34 |
| 3,774,443 A * | 11/1973 | Green et al. | | 73/577 |
| 3,782,182 A * | 1/1974 | Starr | | 73/782 |
| 3,994,598 A * | 11/1976 | Reytblatt | | 356/34 |
| 4,008,960 A * | 2/1977 | Reytblatt | | 356/33 |
| 4,112,746 A * | 9/1978 | Itoh et al. | | 73/789 |
| 4,164,874 A * | 8/1979 | Cassatt et al. | | 73/799 |
| 4,252,440 A * | 2/1981 | Frosch et al. | | 356/216 |
| 4,320,966 A | 3/1982 | Reytblatt | | |
| 4,590,804 A * | 5/1986 | Brull | | 73/762 |
| 4,639,997 A * | 2/1987 | Brull | | 29/407.01 |
| 4,777,358 A * | 10/1988 | Nelson | | 250/225 |
| 4,830,540 A * | 5/1989 | Abrams | | 405/216 |
| 4,840,481 A | 6/1989 | Spillman | | |
| 5,227,731 A * | 7/1993 | Prabhakaran et al. | | 324/718 |
| 5,237,875 A * | 8/1993 | de la Veaux | | 73/775 |
| 5,400,131 A * | 3/1995 | Stockley et al. | | 356/33 |
| 5,425,274 A * | 6/1995 | Creager | | 73/762 |
| 5,528,151 A * | 6/1996 | Perez | | 324/525 |

(Continued)

OTHER PUBLICATIONS

Dulieu-Barton, J.M., "Full-field Experimental Stress/Strain Analysis of Sandwich Structures", Book Sect.—Advanced School of Sandwich Structures 2008 (Lectures), May 2008, 14 pgs. in total, Id code: 51207.

(Continued)

*Primary Examiner* — Roy M Punnoose

(57) ABSTRACT

In accordance with the present invention, a photoelastic layer and a monitoring device with an integrated polarizer for detecting stress and strain is described. Stresses and strains in the photoelastic layer or in the photoelastic monitoring device can be detected using photoelastic methods. The integrated polarizer allows photoelastic inspections to be carried out with non-polarized incident light, thereby reducing inspection costs and time associated with photoelastic analysis. Also in accordance with the present invention, a method is described for photoelastic analysis comprising a photoelastic coating and an integrated polarizer. The integrated polarizer allows for photoelastic analysis using a regular non-polarized light source. Stresses and strains in the photoelastic coating and in the underlying material can be detected easily and quickly.

20 Claims, 7 Drawing Sheets

(56) References Cited

U.S. PATENT DOCUMENTS

| | | | |
|---|---|---|---|
| 5,531,123 A * | 7/1996 | Henkel | 73/795 |
| 5,534,289 A | 7/1996 | Bilder et al. | |
| 5,568,259 A * | 10/1996 | Kamegawa | 356/625 |
| 5,789,680 A * | 8/1998 | Fujimoto | 73/799 |
| 6,055,053 A * | 4/2000 | Lesniak | 356/366 |
| 6,072,568 A * | 6/2000 | Paton et al. | 356/32 |
| 6,094,259 A * | 7/2000 | Kamegawa | 356/32 |
| 6,219,139 B1 * | 4/2001 | Lesniak | 356/366 |
| 6,327,030 B1 * | 12/2001 | Ifju et al. | 356/32 |
| 6,437,885 B1 | 8/2002 | Duncan | |
| 6,441,972 B1 | 8/2002 | Lesniak | |
| 6,460,418 B1 * | 10/2002 | Hiyoshi | 73/800 |
| 6,578,430 B1 * | 6/2003 | Duerr | 73/787 |
| 6,588,282 B2 | 7/2003 | Arms | |
| 6,650,405 B2 * | 11/2003 | Lam et al. | 356/33 |
| 6,867,863 B1 | 3/2005 | Kadlec | |
| 6,882,474 B2 | 4/2005 | Umemoto et al. | |
| 6,928,881 B2 | 8/2005 | Brennen | |
| 6,943,869 B2 * | 9/2005 | Hubner et al. | 356/34 |
| 6,983,660 B2 * | 1/2006 | Kwon | 73/806 |
| 6,985,214 B2 * | 1/2006 | Szaroletta et al. | 356/34 |
| 7,230,421 B2 * | 6/2007 | Goldfine et al. | 324/240 |
| 7,264,852 B2 | 9/2007 | Koishi | |
| 7,361,390 B2 | 4/2008 | Yoda et al. | |
| 7,377,181 B2 * | 5/2008 | Christ et al. | 73/800 |
| 7,477,389 B2 * | 1/2009 | Saha | 356/365 |
| 7,509,872 B2 * | 3/2009 | Hyodo et al. | 73/800 |
| 2002/0176647 A1 | 11/2002 | Spirin et al. | |
| 2004/0066503 A1 * | 4/2004 | Hubner et al. | 356/34 |
| 2005/0164596 A1 * | 7/2005 | Saha | 446/131 |
| 2006/0007424 A1 * | 1/2006 | Hubner et al. | 356/34 |
| 2006/0192177 A1 | 8/2006 | Chen et al. | |
| 2008/0094609 A1 * | 4/2008 | Ragucci et al. | 356/34 |
| 2008/0112048 A1 | 5/2008 | Katou et al. | |
| 2008/0233446 A1 * | 9/2008 | Zimmermann et al. | 429/25 |

OTHER PUBLICATIONS

Vishay Micro-Measurements, "Introduction to Stress Analysis by the PhotoStress Method", Tech Note TN-702-2, Document No. 11212, Revision Aug. 2, 2005, Vishay Micro-Measurements, www.vishaymg.com.

* cited by examiner

PHOTOELASTIC LAYER WITH INTEGRATED POLARIZER

CROSS-REFERENCE TO RELATED APPLICATIONS

This application is entitled to the benefit of the filing date of U.S. Provisional Patent Application No. 61/061,958 filed Jun. 16, 2008.

TECHNICAL FIELD

This invention relates to the field of structural monitoring, stress and strain detection, non-destructive testing, and failure detection. In particular, the invention relates to an improved photoelastic layer for photoelastic inspections and testing.

BACKGROUND ART

Stress and Strain Measurement

Strain, e, is a dimensionless response to stress expressed as a fraction, $e=\Delta L/L_o$, where $L_o$ is the original length of the object and $\Delta L$ is the change in length of the object when stress is applied. Stress, s, is a measure of force per unit area given by F/A where F is the force being applied and A is the area it is being applied to. Because stress cannot be measured directly in practice, strain is measured instead. The stress in an object is related to the strain by the Young's Modulus, E, which is given by the following relationship:

$$E = s/e_{el} = \frac{(F/A)}{(\Delta L/L_o)} = \text{stress}/\text{strain}.$$

Knowing the Elastic Modulus of a given material, the stress in the material can be determined by measuring the strain. Traditionally, stress and strain measurements have been accomplished by a number of different methods. Some of these methods are described below:

Photoelastic Techniques

Photoelastic techniques are optical techniques for detecting stress and strain that exploit the photoelastic properties of certain materials. The speed of propagation of light in transparent materials is generally slower than in a vacuum or in air. The ratio of the speed of light in a given material to the speed of light in a vacuum is called the index of refraction of that material. In homogeneous materials, the index of refraction is constant regardless of the direction of propagation or plane of vibration of the light. In other materials, strain in the material causes the index of refraction to change depending on the direction of propagation of light. These materials, which can be optically isotropic when unstrained, become optically anisotropic when strain is present.

Materials that become optically anisotropic when stressed are known as photoelastic materials. The change in index of refraction relative to index axis in the material can typically be related to the stress and strain in the material by observing and quantifying the photoelastic effect. The photoelastic effect is caused by alternately constructive and destructive interference between light rays that have undergone relative retardation, or phase shift, in the stressed photoelastic material. When illuminated with polarized light and viewed through a polarizing filter, fringe patterns become visible in the photoelastic material that reveal the overall stress and strain distribution in the part and show the locations and magnitudes of the stresses and strains in the part. A person skilled in the art of photoelastic analysis can interpret and measure these patterns.

Photoelastic analysis techniques can be useful because the results are visual and relatively easy to interpret. However, photoelastic analysis has traditionally been limited to R&D and laboratory testing applications because of a number of factors. First, the coatings are difficult to put on and do not lend themselves well to application to production parts. Secondly, specialized equipment is required to conduct the tests and to make the fringe patterns reveal themselves. The specialized equipment includes a source of polarized light and another polarizing filter to view the test specimen through. The second polarizing filter can be integrated into an instrument known as a polarizer. This equipment can be costly and difficult to find. A second problem with traditional photoelastic analysis techniques is the need to illuminate the part with polarized light. This usually requires a dark room and precludes inspections in the presence of non-polarized ambient light and makes outdoor inspections difficult.

Photoelastic Coatings

Photoelastic coatings are available from companies such as Measurements Group (http://www.vishay.com/company/brands/measurements-group/) in sheet form, and also in a liquid plastic form that is cast onto a part and then bonded on using adhesive. Lam and Ellens disclose a method for applying a photoelastic coating using powder coating techniques (U.S. Pat. No. 6,650,405) that is low cost, easy to apply, and can be used on parts with complex three-dimensional shapes. The application of a photoelastic coating using powder coating methods is much less expensive than applying of traditional photoelastic coatings, and for example is suitable for application to parts that are made in higher quantities for field use. Once powder coated with the photoelastic layer, the parts and structures can then be inspected in service using photoelastic techniques to determine if any strain is present in the part or if any plastic deformation has occurred. Applying a photoelastic layer using powder coating methods can be a useful and low cost method of monitoring parts and can increase public safety by helping with early detection of failures before they become catastrophic.

Structural Monitoring

Structures such as buildings, bridges, airplanes, and other critical structures are prone to failure. Failure can happen with significant loss of life and property, as evidenced by the recent collapse of the I-35 bridge in Minnesota. As such, structural monitoring is becoming an even more important field that can have a significant positive impact on public health and safety.

Prior art approaches to structural monitoring typically involve expensive monitoring devices and expensive monitoring systems. A prior art system involving the use of a linear transducer is disclosed by Arms (U.S. Pat. No. 6,588,282). The transducer has two components that move relative to one another, and a clamping mechanism is used to prevent the shortening of the relative strain between the two components. This system has disadvantages because of the moving parts involved, and the precise orientation required for those moving parts to work. Also, the system requires some sort of electronic system to detect the signal. These factors combine to make this system expensive and less suitable for large scale deployment for structural monitoring.

Another prior-art approach to structural monitoring is disclosed by Brennen (U.S. Pat. No. 6,928,881). Brennen's approach involves the use of strain gauges mounted in a housing along with instrumentation that records and stores the stress levels experienced by the structure. While this approach can give an accurate time history of stresses experienced by a structure, it is prohibitively expensive because of the use of on-board monitoring and storage. The collection of all the historical stress data is overkill and unnecessary. The regular storage and retrieval of all the data is too expensive and requires excessively frequent visits to perform downloads. Also, because data will only be recorded at a certain sampling rate, it is possible with Brennen's system to miss key events such as stress strain peaks. This could lead to false conclusions regarding the safety of the structure because key peak events have been missed. Increasing the sampling rate to try to capture these peak key events means more data needs to be stored. Reducing the sampling rate in order to reduce the amount of data stored only makes the problem of missing key events worse.

Bilder et al, (U.S. Pat. No. 5,534,289) discloses a method of structural crack detection that involves the use of microcapsules in a coating that will burst and change the colour of a second coating layer. The coatings also provide environmental protection for the structural part. This method however can only detect cracks, and the requirement of microcapsules containing coloured dyes makes the method difficult and expensive.

Prior art photoelastic layers are limited in their applicability to structural monitoring because of several reasons. One reason is that photoelastic analysis typically requires a polarized light source, and large structures in the field such as bridges are hard to shield from ambient light and hard to illuminate with polarized light. Another reason is that photoelastic analysis typically requires specialized equipment such as a polarized light source and a detector with a built in polarizer to see the fringe patterns. Photoelastic analysis has also typically been limited to laboratory environments. Traditional photoelastic analysis techniques are not well suited to larger structures and analysis in outdoors situations.

Problems with Prior Art

From the description above, it can be seen that prior art methods of photoelastic analysis and structural monitoring can suffer from one or more of the following problems:

- An external source of polarized light is required to inspect structures or devices with photoelastic coatings or properties.
- Inspections in daylight cannot be performed without the need to block out the ambient light. Blocking out the ambient light to perform an inspection is not very practical on a structure such as a bridge when the area in question is not very accessible and the bridge is already being illuminated by ambient light from the sun.
- Inspections with traditional photoelastic techniques require a polarized light source to illuminate the object being inspected in order to perform the inspection. Ambient light cannot be used. This can make it difficult to perform inspections on objects and structures at a distance, particularly when ambient light is present.
- Inspections cannot be made on structures from a distance. For example, inspections cannot be made from ground level on high bridges or overpasses using magnifying optics such as a telescope or telephoto lens on a camera because of the need to illuminate the photoelastic layer or photoelastic-coated monitoring device with polarized light.
- Specialized imaging and detection equipment designed for photoelastic analysis is required to perform the inspections. Regular imaging equipment such as digital cameras cannot be used to perform the inspections. This increases the cost of inspections.
- Two polarizing filters are typically required with traditional photoelastic techniques. These traditional photoelastic techniques typically require a light source, a polarizing filter to polarize the light from the light source, and a second polarizing filter to view the part through.
- Current methods for monitoring structural components such as bridges, buildings, and components such as aircraft landing gear are expensive and do not allow an inspector to determine whether the structure has experienced excessive stress strain levels or not.
- Current stress and strain detection and analysis techniques including photoelastic techniques, strain gauges, and other techniques are not well adapted to use in the field, particularly for long-term low-cost monitoring. Monitoring of stresses and strains in the field using existing instruments and methods typically requires constant monitoring and logging of data to capture the stress strain history of the structure and part. This can be problematic and expensive.
- Without some sort of data-logging, many existing stress and strain detection techniques are not able to communicate to the inspector that a certain level of stress and strain has been experienced by the structure or part even when the structure is no longer experiencing that stress level.
- Existing methods for detecting when stress and strain levels have been exceeded can be expensive to build, to install, and to perform regular inspections on.

In summary, current stress strain detection techniques suffer from a number of problems that make their use in structural monitoring problematic and have prevented the growth of structural monitoring solutions for improving public safety. In particular, photoelastic analysis has been prevented from gaining more widespread acceptance in structural monitoring because traditional photoelastic techniques have not been appropriate for use in structural monitoring.

SUMMARY OF INVENTION

In accordance with the present invention, a photoelastic layer for detecting stress and strain is described. The photoelastic layer comprises a photoelastic material that when strained refracts light anisotropically. The photoelastic layer further comprises a polarizer attached directly to the photoelastic material.

Also in accordance with the present invention, a photoelastic monitoring device is described for structural monitoring. The photoelastic monitoring either comprises a photoelastic material or comprises a photoelastic coating applied to a non photoelastic base material. A reflective layer may be applied on the base material between the base material and the photoelastic coating. The photoelastic device further comprises a polarizer attached or coated directly over at least a portion of the photoelastic material or coating. The photoelastic monitoring device is designed to be attached to a structure or a part. The monitoring device is attached to the structure in such a way that stresses and strains from the structure are transmitted into the photoelastic monitoring device. When a certain predetermined stress or strain is reached, the monitoring device may deform plastically.

Also in accordance with the present invention, a method is described for photoelastic analysis. The method comprises providing a photoelastic material to be analyzed for stresses and strains. A polarizer is attached directly on top of at least a portion of the photoelastic material. The polarizer is attached in such a way such that the photoelastic material can be illuminated with regular light through the polarizer, and such that light can be reflected back through the photoelastic material and back through the polarizer to the observer or the detector. The method comprises illuminating the polarizer with light, and viewing the reflections of light that have traveled through the polarizer, through the photoelastic material, and been reflected back through the photoelastic material and back through the same polarizing layer. Observing or detecting fringe patterns in the reflected light indicate the presence of strain or plastic deformation in the photoelastic material.

BRIEF DESCRIPTION OF DRAWINGS

Having thus generally described the nature of the invention, reference will now be made to the accompanying drawings, showing by way of illustration several embodiments thereof, and in which.

DESCRIPTION OF EMBODIMENTS

Figure 1:
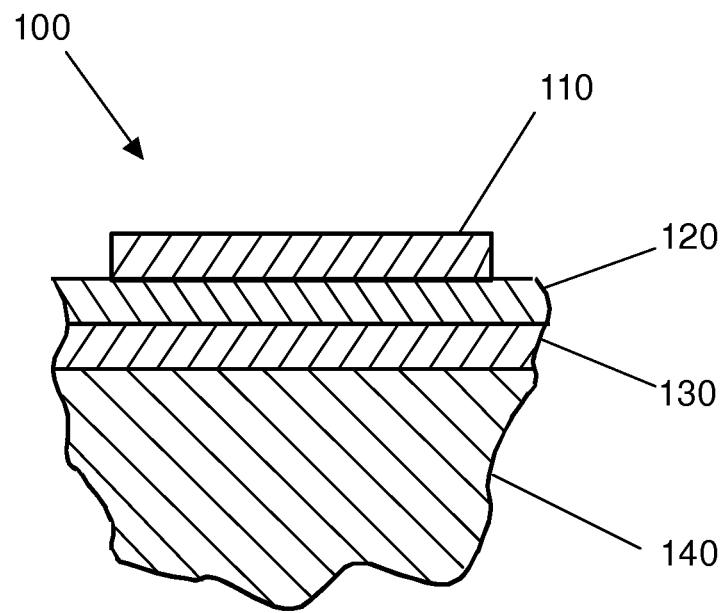
FIG. 1 is a schematic view of a photoelastic layer for structural monitoring with an integrated polarizer according to an embodiment of the present invention.

The following detailed description includes references to the accompanying drawings, which form a part of the detailed description. The drawings show, by way of illustration, specific embodiments in which the invention may be practiced. These embodiments, which are also referred to herein as "examples", are described in sufficient detail to enable those skilled in the art to practice the invention. The embodiments may be combined, other embodiments may be utilized, or structural, mechanical, and material composition changes may be made without departing from the scope of the present invention. The following detailed description is, therefore, not to be taken in a limiting sense, and the scope of the present invention is defined by the appended claims and their equivalents.

The present invention provides an improved photoelastic layer with an integrated polarizer. Traditionally, the polarizers required for photoelastic analysis were stand-alone filters or were built into the light source and the detecting equipment. Photoelastic analysis was carried out in dark laboratories so the test piece could be illuminated with polarized light. These techniques were not suitable for outside inspections or structural monitoring. Integrating a polarizer into a photoelastic layer provides a number of advantages. A polarizer is attached directly to or within a certain distance of the photoelastic material. Light travels through the polarizer to reach the photoelastic material. It then travels through the photoelastic material, reflects back through the photoelastic material and then through the same polarizer. The integrated polarizer may cover all of the photoelastic material, or only a portion of the photoelastic material.

The integrated polarizer greatly simplifies the equipment necessary for conducting photoelastic analysis and inspections. For example, a photoelastic layer with an integrated polarizer makes the use of a regular light source and a regular camera possible for viewing fringe patterns in the photoelastic material. This makes photoelastic inspections and analysis much simpler, easier, and lower cost, especially out in the field. In addition to removing the need for a special polarized light source, a photoelastic layer with an integrated polarizer can even remove the need for a light source to do the analysis, particular in outdoor settings where there is sunlight and ambient available to illuminate the photoelastic material through the integrated polarizer. Traditionally, any ambient light would typically have to be blocked out to perform the test with a polarized light source. The integrated polarizer has the advantage that blocking of ambient light is not required, and in fact the ambient light can be used as the light source.

By moving cost from the inspection to the photoelastic layer, the photoelastic layer with integrated polarizer can greatly facilitate quick and easy inspections of large structures such as bridges and buildings. This invention makes the use of photoelastic analysis for structural monitoring applications more feasible and lower cost.

Description of Example with Integrated Polarizer—FIG. 1

FIG. 1 is a schematic diagram showing an example of a photoelastic layer 100 with an integrated polarizer 110 according to an embodiment of the present invention. A polarizer 110 is integrated into a photoelastic layer 100 comprising a photoelastic material 120, a reflective layer 130, and integrated polarizer 110. Photoelastic layer 100 is attached onto a structure 140. Reflective layer 130, photoelastic material 120, and polarizer 110 can be applied structure 140 individually, or combined together into a laminated unit first before attaching to structure 140. Reflective layer 130 and photoelastic material 120 can also be formed into a sheet and bonded onto structure 140 (for example by using adhesives such as epoxy or pressure sensitive film) before polarizer 110 is attached. An example of a photoelastic sheet combining a reflective layer and a photoelastic material is the PS-1 material available from Measurements Group of Raleigh, N.C.

Photoelastic material 120 and reflective layer 130 can be applied using a number of techniques, including powder coating, coating with wet paint, or laminating. Structure 140 can be a part to be analyzed such as the landing gear of an aircraft, or a structure to be monitored such as a bridge or a building. Polarizer 110 can attached to photoelastic material 120 and structure 140 using adhesives, pressure sensitive films, heat, pressure, bolts, rivets, tape, or other means. Polarizer 110 can cover all of the photoelastic material 120, or it can cover only a portion of photoelastic material 130, as is shown in FIG. 1. Polarizer 110 can also be applied using powder coating, spraying, or wet coating an appropriate material onto photoelastic material 110. An example of a material that can be used to make integrated polarizer 110 is a polyvinyl alcohol (PVA) polymer. Other materials are possible. Examples of PVA polarizers and other types of polarizers are available from American Polarizers, Inc. of Reading, Pa. Integrated polarizer 110 can also comprise a quarter wave plate for changing linearly polarized light to circularly polarized light and vice versa. Reflective layer 130 can be used to enhance the reflection of light back through photoelastic material 120. However, reflective layer 130 may not be necessary if the surface of structure 140 is appropriate for creating a reflection back through photoelastic material 120 and polarizer 110.

Figure 2:
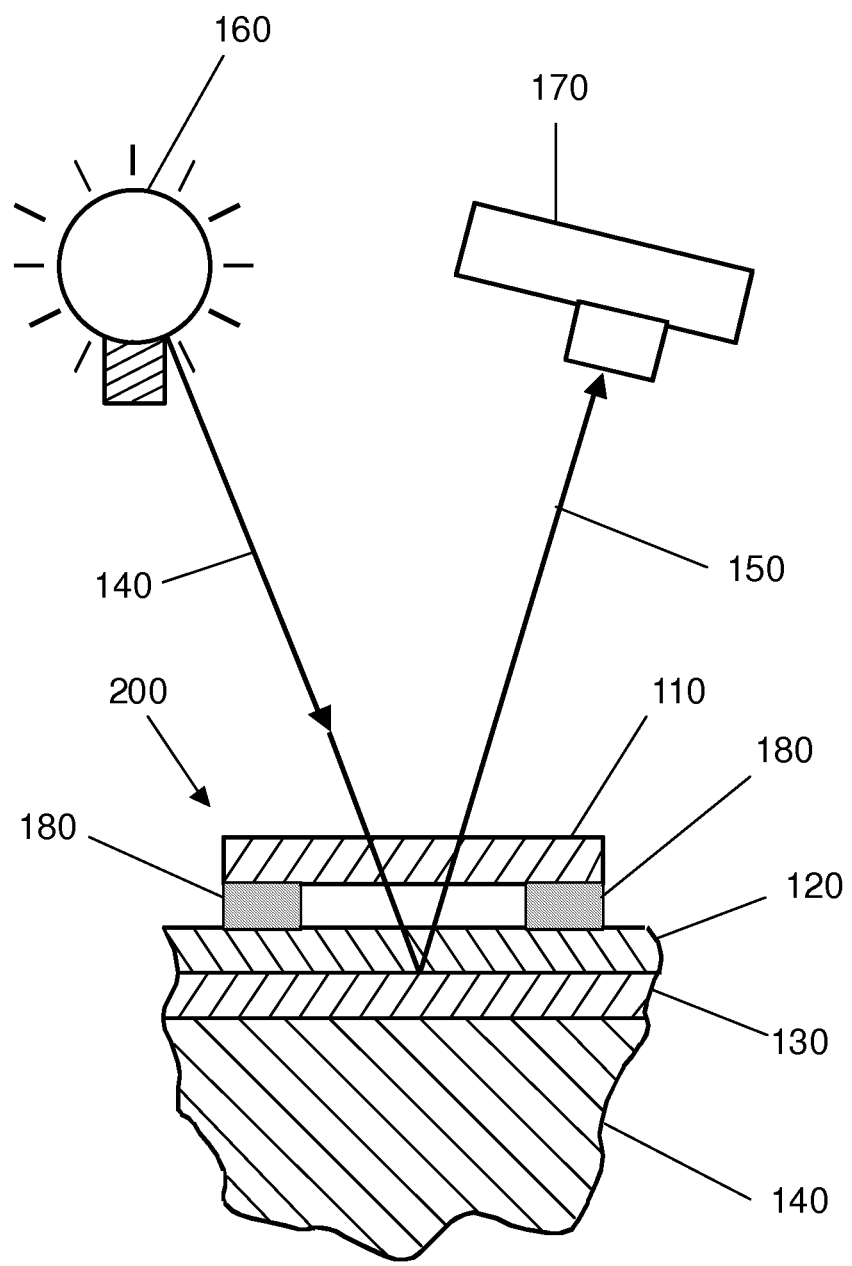
FIG. 2 is a schematic view of a photoelastic layer for structural monitoring with an integrated polarizer according to an embodiment of the present invention.

Description of Example with Integrated Polarizer—FIG. 2

FIG. 2 is a schematic diagram showing a photoelastic layer 200 with an integrated polarizer 110 according to an embodiment of the present invention. In this embodiment, polarizer 110 is attached to photoelastic material 120 with spacers 180. Spacer 180 can be for example a double-sided adhesive or an epoxy, or it can be a mechanical spacer. Spacer 180 can bond a portion of polarizer 110 to photoelastic material 120, or, in the case of a transparent or optically clear material it can bond substantially all of polarizer 110 to photoelastic material 120. The thickness of the spacer 180 can be kept to a minimum in order to make it easier for the reflected light to pass through polarizer 110. For example, the thickness of spacer 180 can be from zero to 100 mm, or from zero to 1,000 mm thick. In an example, polarizer 110 can be a sheet of circular polarizing material available from Edmunds Optics of Barrington, N.J. The circular polarizing material comprises a linear polarizer with a ¼λ retarder to produce circularly polarized light. Other polarizing materials are possible. Photoelastic material 120 can be a layer of transparent or translucent powder coat material that is applied electrostatically as a powder and fused together with heat, as disclosed by Lam et al. in U.S. Pat. No. 6,650,405. Spacer 180 can be a 50 micron thick optically clear laminating adhesive 8172 from 3M of St. Paul, Minn. Other photoelastic materials and other spacer materials are also possible.

Referring again to FIG. 2, photoelastic material 120 is bonded to reflective layer 130. Reflective layer 130 is bonded to substrate 140. In one example, reflective layer 130 can be a near-chrome powder coat also applied electrostatically in powder form and fused together with heat. Substrate 140 can be any sort of structure or part that is to be inspected or analyzed for stress strain. For example, substrate 140 can be a gusset plate in a bridge, a steel beam in a building, or a frame member in a piece of heavy earth-moving equipment.

Photoelastic analysis can be carried out by illuminating photoelastic layer 200 with a light source 160. Ambient light or light from the sun can also be used to illuminate photoelastic layer 200. Light 140 from light source 160 travels through polarizer 110 and into photoelastic material 120. It travels through photoelastic material 120, reflects off the surface of reflective layer 130, and travels back through photoelastic material 120 and polarizer 110. Reflected light 150 can be detected and recorded by a camera 170 or some other instrument, or it can be viewed by an observer to determine if any fringe patterns are evident in the reflected light. Fringe patterns indicate the degree of stress and strain being experienced by photoelastic material 120, which if properly bonded to structure 140 indicates the amount of stress strain being experienced by structure 140. The number and appearance of the fringe patterns in evidence for a certain stress and strain level depends on the material properties and the thickness of photoelastic material 120. If structure 140 is no longer under load, the presence of fringe patterns can indicate that plastic deformation has occurred in structure 140. This can indicate that structure 140 has experienced loads that are sufficient to cause the material in structure 140 to reach and exceed the yield point of the material. After an inspection to detect fringe patterns, polarizer 110 can remain attached to photoelastic material 120 so as to be ready for the next inspection. Photoelastic layer 200 with an integrated polarizer 110 has the advantage that the inspector does not need to carry around any polarizers or sources of polarized light as with traditional photoelastic analysis in order to conduct the inspection. Inspections can be performed with non-specialized instruments such as a regular digital camera. If the inspection location is far away from the inspector, a camera with a telephoto lens can be used to perform the inspection.

Figure 3:
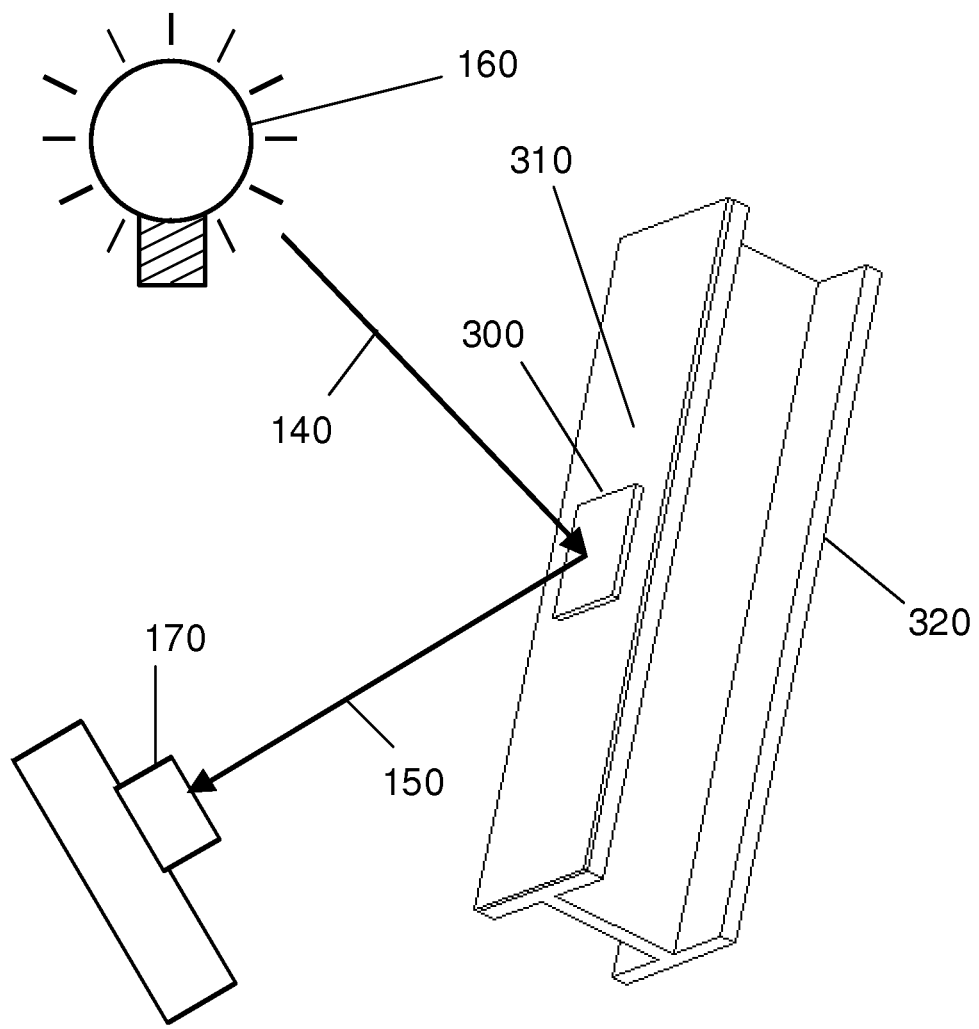
FIG. 3 is a is diagrammatic view showing the use of a photoelastic layer with an integrated polarizer according to an embodiment of the present invention.

Description of Photoelastic Layer with Integrated Polarizer—FIG. 3

FIG. 3 is a general view of a photoelastic layer with an integrated polarizer according to an embodiment of the present invention. A layer of photoelastic material 310 is attached to a structure 320 to be monitored or tested. Photoelastic material 310 in this example can be applied by a number of methods as in previously described embodiments. For example it can be applied using powder coat methods as described by Lam et al. in U.S. Pat. No. 6,650,405 or as a liquid coating. It can also be applied as a sheet of photoelastic material that is bonded onto the surface of structure 320. The photoelastic layer may comprise a reflective layer interposed between the photoelastic material 310 and the surface of structure 320. A polarizer 300 is integrated into the photoelastic layer by attaching it over at least a portion of photoelastic material 310. Alternatively, polarizer 300 can be attached over the entirety of photoelastic material 310. Attaching polarizer 300 over only a small portion of photoelastic material 310 has the advantage of lower cost and focussing the attention of inspectors and test personnel on areas of interest. Attaching polarizer 300 over the entirety of photoelastic material 310 has the advantage of being able to identify where high stresses and strains in structure 320 are occurring or have occurred. This can be particularly useful if the stress strain distribution in structure 320 is not previously known. Polarizer 300 can be attached to photoelastic material 310 and structure 320 using adhesives, screws, rivets, or some other means of attachment. Alternatively, it could be sprayed on our coated on using liquid techniques.

Structure 320 could be a part such as a landing strut on an aircraft, a rafter in a building, or a truss member on a bridge. Integrated polarizer 300 can simplify and reduce the cost of inspections of structure 320. Inspections can be performed by illuminating integrated polarizer 300 with light 140 from a light source 160, and viewing the reflected light 180 that passes through polarizer 300 and photoelastic material 310. Fringe patterns can be observed by an observer, or they can be detected and recorded by a camera 170. For situations where it would be impractical to illuminate polarizer 300 (e.g., on a bridge structure in daylight), ambient light from a source such as the sun could be used in place of light source 160. Integrated polarizer 300 stays fixed to photoelastic material 310 and greatly facilitates future inspections or multiple inspections on the same area.

Another significant benefit of the photoelastic layer with integrated polarizer 300 is inspections can be performed at a distance by equipping camera 170 with a telephoto lens. For example, a truss on a bridge that is not easily accessible due to its height from the ground can be readily inspected using ambient light from the sun for the light source and by using a pair of binoculars or a telephoto lens on a camera. The data collected using such a method can be easily understand and easily interpreted. The data can also be easily transmitted via electronic or other means for further analysis. All of these factors can help to simplify inspections and reduce inspection costs, thereby increasing safety by allowing more frequent and regular inspections.

Figure 4:
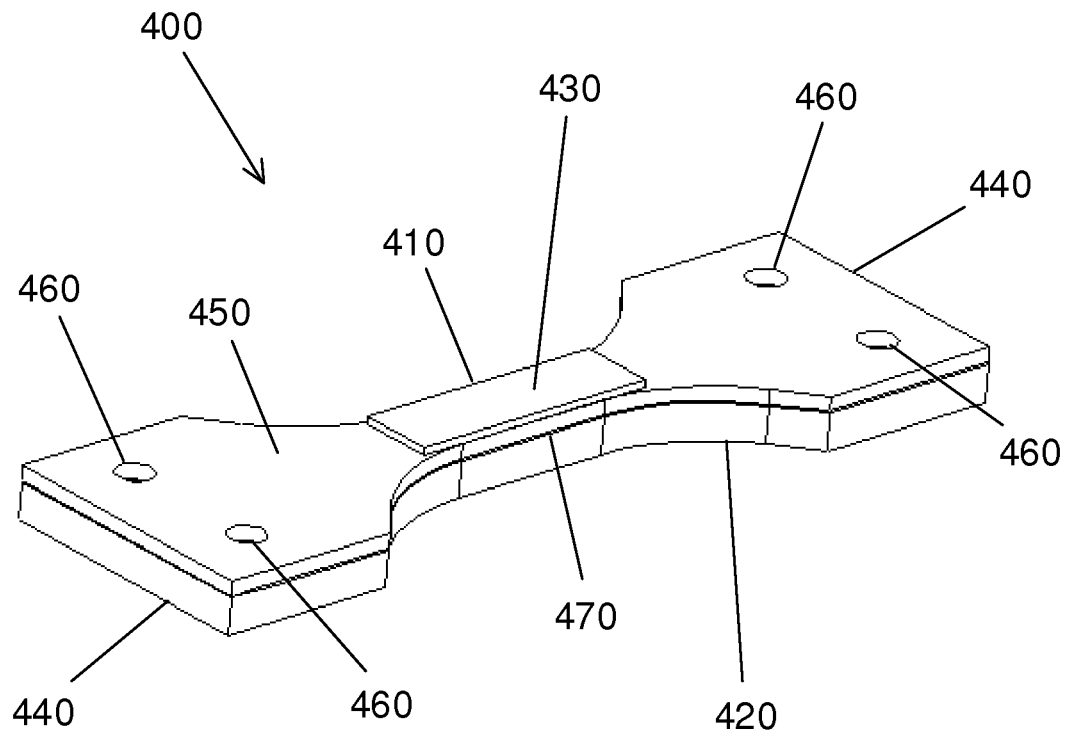
FIG. 4 is a general view of a photoelastic monitoring device with an integrated polarizer according to an embodiment of the present invention.

Description of Example of Monitoring Device with Integrated Polarizing Layer—FIG. 4

FIG. 4 shows a general view of a structural monitoring device with an integrated polarizer, according to an embodiment of the present invention. Monitoring device 400 is an example of a photoelastic device designed for structural monitoring. Monitoring device 400 has ends 440, means 460 for attachment to a structure to be monitored, and a detection zone 430. In the embodiment shown FIG. 4, monitoring device 400 comprises a base material 420 that has been coated with a reflective layer 470 and a with a photoelastic material 450. An integrated polarizer 410 is attached on top of photoelastic material 450 in detection zone 430. Alternatively, integrated polarizer 410 can cover the entirety of photoelastic material 450.

Monitoring device 400 including integrated polarizer 410 can be attached to a structure or a part to be monitored using attachment points 460, or by attaching ends 440 to an underlying structure. Monitoring device 400 is attached in such a way that stresses and strains in the underlying structure are transferred into monitoring device 400 and concentrated into detection zone 430 in a known manner. Monitoring device 400 can be designed such that it plastically deforms when a certain stress strain level is experienced by the structure it is attached to. Inspections can be performed on monitoring device 400 by illuminating polarizer 410 with unfiltered light and viewing the reflections that have travelled through polarizer 410, through photoelastic material 450, reflected off reflective layer 470, and travelled back through photoelastic material 450, and back through polarizer 410. If device 400 has plastically deformed or is currently experiencing elastic strain, fringe patterns will be visible indicating the presence of strain of plastic deformation. This can indicate very quickly to an inspector whether the structure being monitored has experienced overloading or not.

In another embodiment, the base material that monitoring device 400 is made out of is itself a photoelastic material. For example, the shape of monitoring device 400 could simply be cut out of a photoelastic sheet such as the PS-1 photoelastic material from Measurements Group of Raleigh, N.C. In this example, the reflective layer could be located on the bottom of device 400 as it is with the PS-1 material. Polarizer 410 could then be attached directly to the photoelastic material.

A monitoring device 400 according to the above embodiments could have the advantage of very low manufacturing cost. It can be attached to a structure or a part to be monitored and provide very useful information about the stresses and strains that are being experienced or have been experienced by that structure or part. This could greatly enhance public safety and to save on monitoring and inspection costs of structures and buildings, helping to address the significant problem of aging infrastructure in North America.

Figure 5:
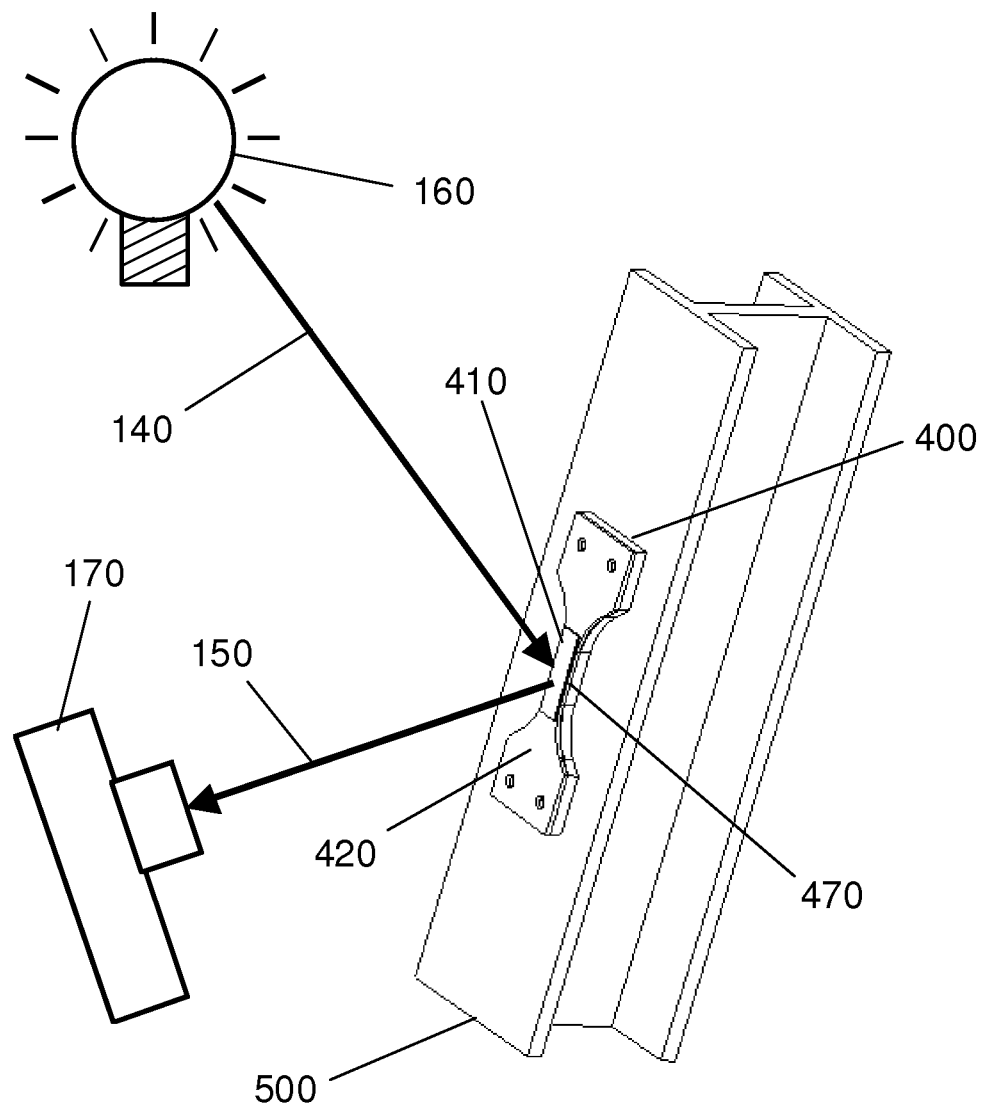
FIG. 5 is a is diagrammatic view showing the use of a photoelastic monitoring device with an integrated polarizer according to an embodiment of the present invention.

Description of Example—FIG. 5

FIG. 5 is a general view of a monitoring device 400 with an integrated polarizer 410 mounted on a structure 500, according to an embodiment of the present invention. Structure 500 can be a truss on a bridge, a part of an aircraft landing gear, or any other structure that is subjected to loads that can cause stress and strain in a structure. Structure 500 may have been subjected to loads that are no longer present, or it can still be under load. To determine if previous or present loads have caused stresses in excess of a predetermined amount, monitoring device 400 can be illuminated with a light source 160. Light source 160 can be an electrical light source, or it can be any other light source such as ambient light or daylight from the sun. Light 140 from the light source passes through integrated polarizer 410 and into photoelastic material 420. Reflected light 150 reflects off reflective layer 470 and passes back through photoelastic material 420 and back through integrated polarizer 410. Stress and strain transferred to photoelastic material 420 from structure 500 causes fringe patterns to be visible in reflected light 150. The fringe patterns can be viewed, detected by an instrument, or recorded by a camera 170. Inspection using a camera 170 or other detector can help to reveal whether structure 500 has been overloaded or has experienced stresses and strains beyond the safe limit for structure 500. If device 400 shows that excessive stresses and strains have been experienced, further action can be taken to remedy the situation or to prevent further possible catastrophic failure.

Figure 6:
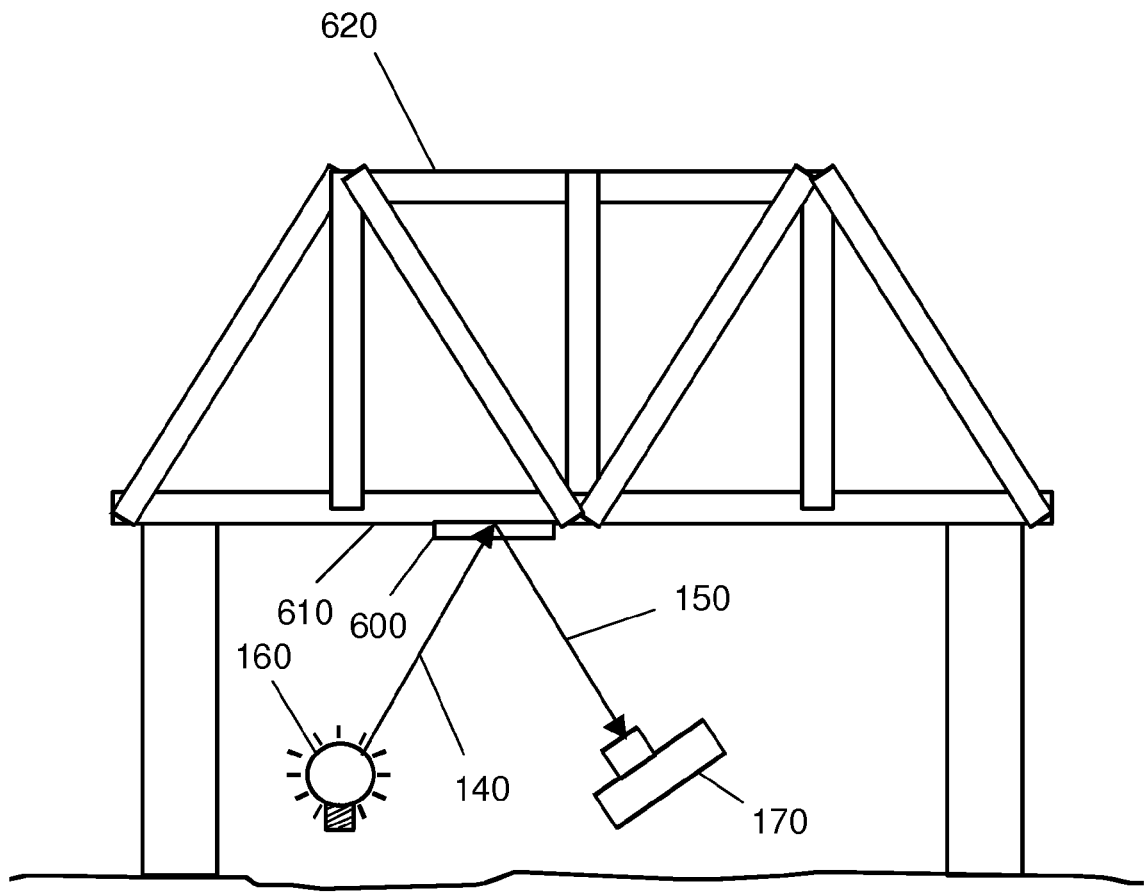
FIG. 6 is a diagrammatic view showing the use of a photoelastic layer with an integrated polarizer according to an embodiment of the present invention.

Description of Example of Integrated Polarizer—FIG. 6

FIG. 6 shows a diagrammatic view of a structure 620 coated with a photoelastic material 610 with an integrated polarizer 600, according to an embodiment of the present invention. Integrated polarizer 600 makes photoelastic inspections of structure 620 simpler and reduces the cost of inspections because it removes the need for a polarized light source and specialized instruments with polarizing filters to perform photoelastic inspections on structure 620. The need for shielding the area of interest from ambient light such as daylight can be avoided by locating integrated polarizer 600 in close proximity to photoelastic material 610. Integrated polarizer 600 should be attached sufficiently close to photoelastic material 610 so that a significant proportion of light 140 from light source 160 that is incident on the portion of photoelastic material 610 that is of interest passes through integrated polarizer 600. Accordingly, the space between integrated polarizer 600 and photoelastic material 610 should be from 0 to 1,000 mm., or the space can be from 0 to 100 mm to further reduce light leakage around the outside of integrated polarizer 600.

Figure 7:
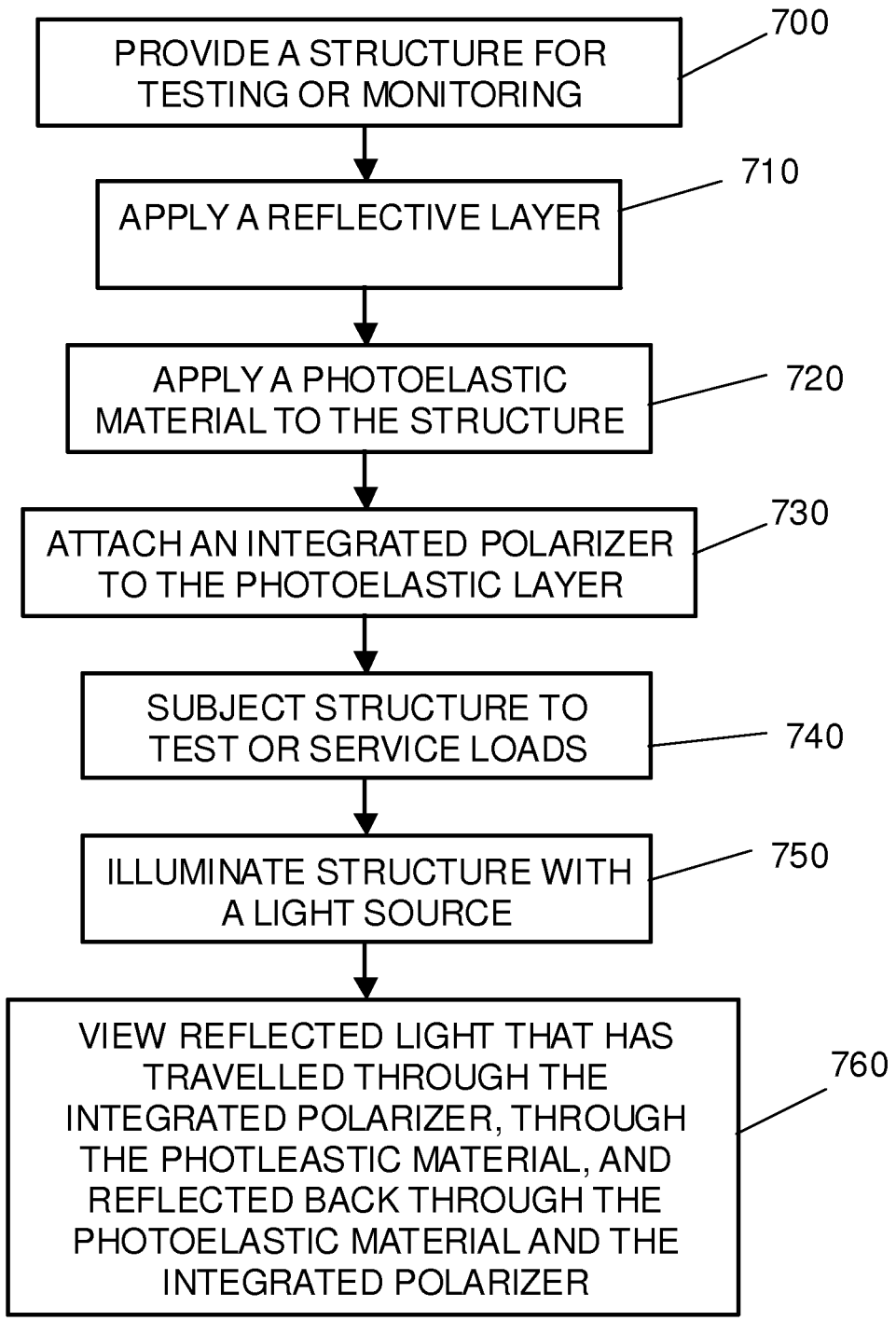
FIG. 7 is a flow chart showing a series of steps for inspecting a structure using a photoelastic layer with an integrated polarizer according to an embodiment of the present invention.

Description of Example Method for Structural Monitoring Using a Polarizer Attached to a Photoelastic Layer—FIG. 7

FIG. 7 describes a method for monitoring structures or parts to detect for stress and strain levels in that structure or part according to an embodiment of the present invention. The method comprises a step 700 of providing a structure or part for testing or monitoring. The structure or part could be the actual structural part of interest itself, or it could be a photoelastic monitoring device designed to attach to a structure or part of interest. In this example the method comprises a step 710 of applying a reflective layer to a structure or part such as a silver colored paint. If the surface of the structure or part is adequately reflective (e.g., the shiny surface of a metallic structure) a reflective layer may not be required. Next is a step 720 of applying a photoelastic material to the structure or a portion of the structure. The method further comprises a step 730 of attaching an integrated polarizer or polarizing layer on top of the photoelastic material. A single integrated polarizer can be attached over a portion of the polarizing material in a point of interest, or multiple integrated polarizers can be attached at various points of interest on the photoelastic material. Alternatively, the integrated polarizer can cover all of the photoelastic material. The points of interest can be chosen to correspond to critical areas where regular inspection is desired to monitor for excessive stresses or overloading. The structure is at this point ready for inspection and can be subjected to test or service loads (step 740). Inspections can be performed when service or test loads have been removed, or when service and test loads are still present. To perform the inspection, a step 750 comprises illuminating the part of the structure with the integrated polarizer with a source of light. The method then comprises a step 760 of viewing or detecting reflected light that has traveled through the integrated polarizer, through the photoelastic material, reflected off the reflective layer, travelled back through the photoelastic material and back through the integrated polarizer to the observer. The presence or absence of fringe patterns in the reflected light provides information regarding the stress and strain that is being experienced by the structure, or, if plastic deformation has occurred, stress and strain that has been experienced by the structure in the past. Because the method comprises step 730 of attaching an integrated polarizer to the photoelastic material, inspections can be simplified because a regular light source can be used (including the sun), and inspections can be performed with regular equipment such as cameras without the need for specialized equipment or light sources with polarizing filters. Inspections can also be carried out from a distance if need be using for example a telephone lens mounted on the camera.

In summary, the present invention provides a device with an integrated polarizer attached to a photoelastic material and a method of applying and using a photoelastic layer with an integrated polarizer. From the description above, specific embodiments of the present invention may provide one or more of the following advantages:

Facilitates and makes possible the use of photoelastic techniques for inspecting large structures such as bridge and buildings An external source of polarized light is not required to inspect structures or devices with photoelastic layers comprising an integrated polarizer.

Inspections in daylight can be performed without the need to block out the ambient light. In fact, ambient light could be used as the light source for the inspection.

Inspections can be made on structures from a distance. For example, inspections can be made from ground level on high bridges or overpasses using magnifying optics such as a telescope or telephoto lens on a camera.

Regular imaging equipment such as digital cameras can be used to perform the inspections without the need for specialized inspection equipment with polarizing filters or a polarized light source.

Only one integrated polarizer is required to do the inspection whereas two polarizing filters are typically required with traditional photoelastic techniques.

The integrated polarizer can be used to indicate key areas of interest to help guide an inspector when the integrated polarizer is placed on a portion of the photoelastic material; the integrated polarizer can act as "targets" for the inspector.

Many modifications, substitutions, and improvements will be apparent to the skilled artisan without departing from the spirit and scope of the present invention as described herein and defined in the claims.

INDUSTRIAL APPLICABILITY

The present invention has industrial applicability to the field of photoelastic analysis and the field of structural monitoring.

We claim:

1. A photoelastic layer for detecting stress and strain in a structural member comprising a single layer of photoelastic material applied to or attached to the surface of said structural member, said single layer of photoelastic material comprising material that refracts light anisotropically when stressed or strained, an integrated polarizer proximate to and on top of said single layer of photoelastic material covering at least a portion of said single layer of photoelastic material for polarizing non-polarized incident light to allow detection of stresses and strains in said single layer of photoelastic material and in said structural member.

2. The photoelastic layer according to claim 1 wherein said integrated polarizer is attached permanently to said single layer of photoelastic material.

3. The photoelastic layer according to claim 1, wherein said integrated polarizer comprises a layer of polarizing material deposited onto at least a portion of said single layer of photoelastic material.

4. The photoelastic layer according to claim 1, wherein said photoelastic layer comprises said single layer of photoelastic material applied to or attached to the surface of an engineered structure that is designed primarily to support a load.

5. The photoelastic layer according to claim 1, wherein said integrated polarizer comprises a quarter wave plate for rotating the axis of polarized light.

6. The photoelastic layer according to claim 1 wherein said photoelastic layer comprises said single layer of photoelastic material applied to or attached to the surface of a civil engineering structure such as a building or a bridge.

7. The photoelastic layer according to claim 1 wherein said photoelastic layer comprises said single layer of photoelastic material applied to or attached to the surface of a vehicle such as an airplane, an automobile, or a piece of earth-moving equipment.

8. A monitoring device for detecting stress and strain in a structure, said monitoring device comprising a base material, one or more attachment points for attaching said monitoring device to said structure, a detection zone, a single layer of photoelastic material that when strained refracts light anisotropically, said single layer of photoelastic material covering or forming at least a portion of said detection zone, and an integrated polarizer proximate to and on top of said single layer of photoelastic material for polarizing non-polarized incident light, said integrated polarizer covering at least a portion of said single layer of photoelastic material to allow detection of stresses and strains in said single layer of photoelastic material, said base material and the dimensions of said monitoring device chosen so that a predetermined level of strain transmitted to said monitoring device by said structure through said attachment points results in a known level of stress and strain in said detection zone.

9. The monitoring device according to claim 8 further comprising means for attaching said integrated polarizer to said single layer of photoelastic material.

10. The monitoring device according to claim 8 comprising an integrated polarizer that is coated directly onto said single layer of photoelastic material.

11. The monitoring device according to claim 8 comprising a reflective layer underneath said single layer of photoelastic material.

12. The monitoring device according to claim 8 comprising an integrated polarizer with a quarter wave plate for rotating the axis of polarized light.

13. The monitoring device according to claim 8 wherein said base material comprises a single layer of photoelastic material.

14. The monitoring device according to claim 8 wherein said detection zone deforms plastically when said predetermined level of strain is transmitted to said monitoring device by said structure through said attachment points.

15. The method of claim 8 wherein the step of providing a structural member comprises providing a structural member that comprises a portion of a larger structure that is designed primarily to support a load.

16. A method of structural monitoring comprising the steps of:
a) providing a structural member,
b) attaching a single layer of photoelastic material to said structural member, said single layer of photoelastic material comprising material that refracts light anisotropically when stressed or strained, c) providing an integrated polarizer and attaching said integrated polarizer to at least a portion of said single layer of photoelastic material, said integrated polarizer attached in such a way to permit viewing of said single layer of photoelastic material through said integrated polarizer and for light to be reflected back through the same said integrated polarizer to an observer or a detector,
d) illuminating said integrated polarizer with light,
e) viewing the reflections of light that have traveled through said integrated polarizer, through said single layer of photoelastic material, and reflected back through said single layer photoelastic material and said integrated polarizer to said observer or said detector, whereby fringe patterns observed in said reflections of light indicate strain in said single layer of photoelastic material.

17. The method of claim 16 wherein the step of attaching a single layer of photoelastic material to said structural member comprises applying said single layer of photoelastic material as a dry powder and fusing it together with heat to form a continuous coating.

18. The method of claim 16 wherein the step of attaching a single layer of photoelastic material to said structural member comprises first coating said single layer of photoelastic material onto, or forming said single layer of photoelastic material into, a device for structural monitoring, and then attaching said device for structural monitoring to said structural member.

19. A method according to claim 16 wherein the step of viewing said reflections of light that have traveled through said integrated polarizer, through said single layer of photoelastic material, and reflected back through said single layer of photoelastic material and said integrated polarizer comprises viewing and recording said fringe patterns using a camera.

20. A method according to claim 19 wherein the step of viewing and recording said fringe patterns using said camera comprises utilizing a telephoto lens with said camera to view and record said fringe patterns.

* * * * *